April 20, 1954  J. J. JUBELL  2,676,225
ELECTRIC TRAILER BRAKE ACTUATOR
Filed Aug. 27, 1951  2 Sheets-Sheet 1
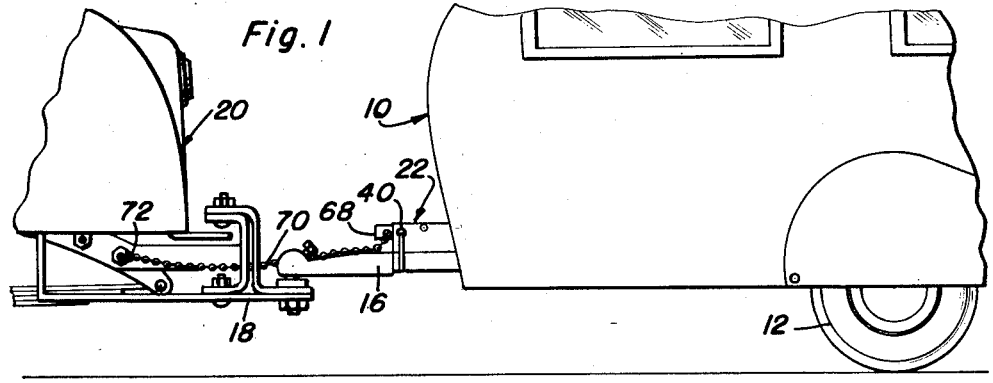
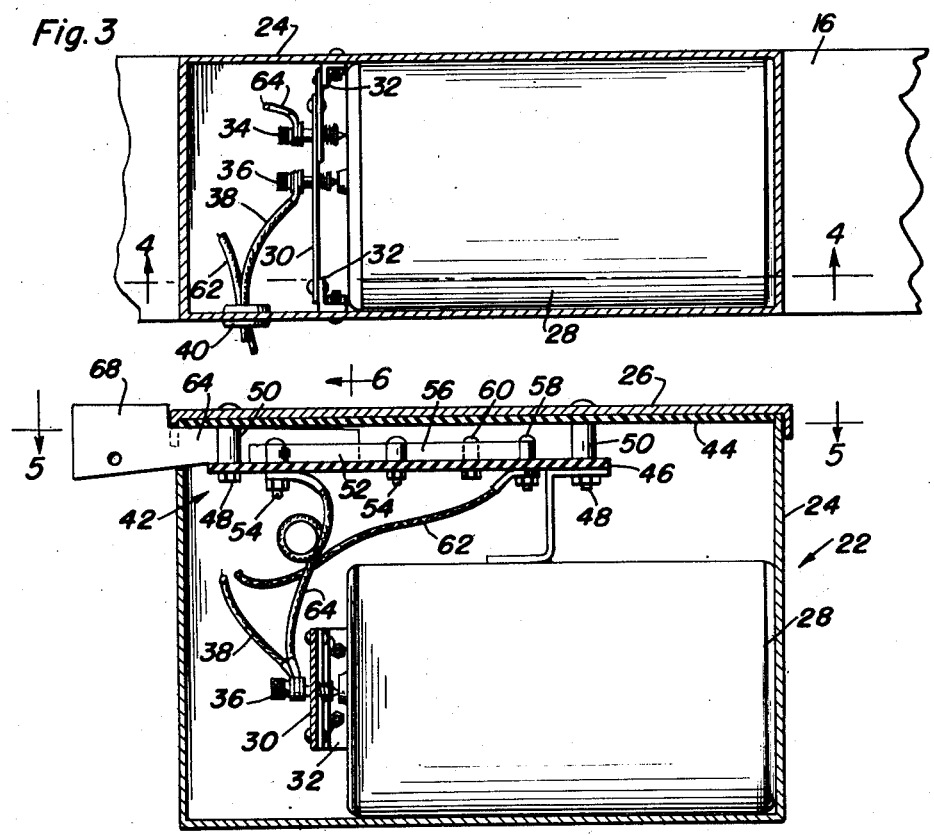
Jesse J. Jubell
INVENTOR.

April 20, 1954   J. J. JUBELL   2,676,225
ELECTRIC TRAILER BRAKE ACTUATOR
Filed Aug. 27, 1951   2 Sheets-Sheet 2
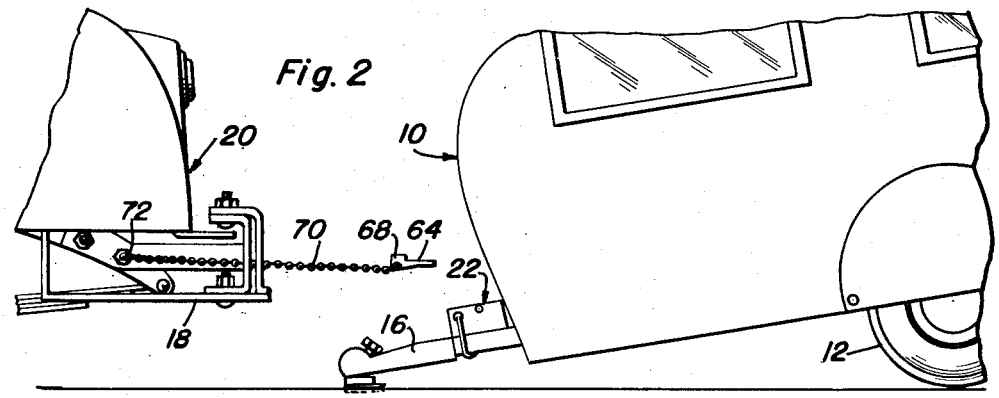
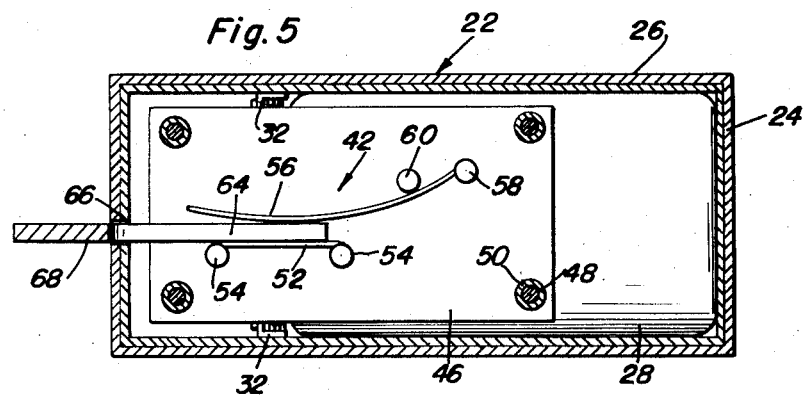
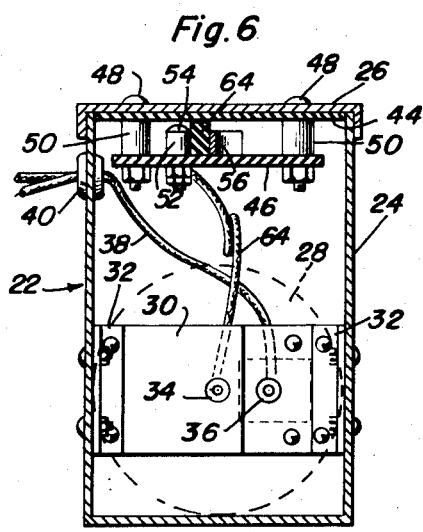
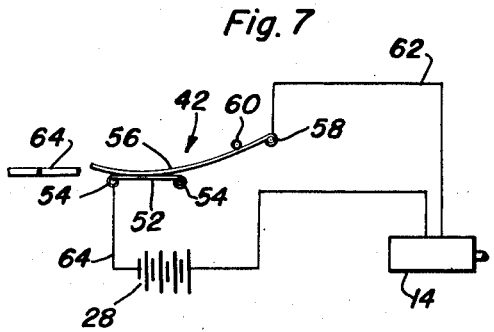
Jesse J. Jubell
INVENTOR.

Patented Apr. 20, 1954

2,676,225

UNITED STATES PATENT OFFICE 2,676,225

ELECTRIC TRAILER BRAKE ACTUATOR

Jesse J. Jubell, Boone, Iowa

Application August 27, 1951, Serial No. 243,871

2 Claims. (Cl. 200—153)

This invention relates to new and useful improvements and structural refinements in actuators for brakes, particularly electric trailer brakes, and the principal object of the invention is to provide means for automatically applying the brakes of the trailer when the connection between the trailer and the drawing vehicle has been accidentally or unintentionally broken.

Some of the advantages of the invention reside in its simplicity of construction, in its efficient and dependable operation, and in its adaptability for use in association with trailers of different types.

With the above more important objects and features in view, and such other objects and features as may become apparent as this specification proceeds, the invention consists essentially of the arrangement and construction of parts as illustrated in the accompanying drawing, in which:

Figure 1 is a side elevational view, partly broken away, illustrating the invention applied to a trailer and to a drawing vehicle, the latter and the trailer being shown connected together;

Figure 2 is a side elevational view, similar to that shown in Figure 1, but illustrating the trailer disconnected from the drawing vehicle;

Figure 3 is a top plan view of the invention with the cover thereof removed;

Figure 4 is a vertical sectional view, taken substantially in the plane of the line 4—4 of Figure 3, but with the cover and switch in place;

Figure 5 is a horizontal sectional view, taken substantially in the plane of the line 5—5 in Figure 4;

Figure 6 is a vertical sectional view, taken substantially in the plane of the line 6—6 in Figure 4, and Figure 7 is a wiring diagram of the electrical components used in the invention.

Like characters of reference are employed to designate like parts in the specification and throughout the several views.

Referring now to the accompanying drawings in detail, the general reference character 10 designates the trailer having electric brakes on the wheels 12 thereof, the brakes being of any suitable and conventional construction and being actuated electrically by means of a solenoid 14 (see Fig. 7).

The trailer 10 is provided with a draw bar 16 connected to a conventional hitch 18 at the back of a drawing vehicle 20, and the invention resides in the provision of an electric brake actuator designated generally by the reference character 22.

The actuator 22 comprises a rectangular, elongated housing 24 which is suitably secured to the draw bar 16 and is provided with a removable cover 26, the lower portion of the housing accommodating a removable battery 28 for energizing the brake actuating solenoid 14.

The housing 24 is somewhat longer than the battery 28 and a cross strap 30 of insulating material is provided in the housing 24 at one end of the battery, the cross strap being suitably secured to the housing by angle brackets 32. The insulated cross strap 30 carries a pair of suitable terminals 34, 36, which electrically engage the poles of the battery 28, the terminal 36 being connected by a conductor 38 to the solenoid 14. Needless to say, the conductor 38 extends outwardly from the housing 24 through an insulating grommet 40, as will be clearly apparent.

A switch assembly designated generally by the reference character 42 is mounted on the under side of the cover 26 and is disposed within the housing 24, the switch mechanism being disposed between spaced upper and lower insulating plates 44, 46 respectively, which are secured to the under side of the cover 26 by a plurality of screws 48, provided with spacers 50.

The switch mechanism includes a relatively stationary contact member 52 which is attached to the plate 46 by a pair of screws 54, while an arcuate, resilient contact member or strip 56 is attached at one end thereof to the plate 46 by a screw 58 and a block 60 is provided on the plate 46 to sustain the member 56 in a position wherein it engages the stationary member 52, as is best shown in the diagram of Fig. 7.

The screw 58 of the contact member 56 is connected by a conductor 62 to the solenoid 14, the conductor 62 extending outwardly from the housing 24 through the aforementioned grommet 40. On the other hand, one of the screws 54 of the contact member 52 is connected by a conductor 64 to the terminal 34, whereby the switch 42 is connected in series with the battery 28 and the solenoid 14.

Means are provided for sustaining the switch 42 in an open position, these means consisting of an insulator 64 which may be inserted through an opening 66 into the housing 24 so that it spreads the contact members 52, 56 apart and is disposed therebetween to electrically isolate the same, as is clearly shown in Figure 5.

The insulator 64 is provided with enlarged head 68 to prevent the same from being inserted too far into the housing, and a flexible element such as a length of chain 70 is connected at one end thereof to the head 68 while its other end is fastened to any part of the hitch 18 or the vehicle 20, as desired, this being illustrated at 72.

It will be apparent from the foregoing that as long as the trailer 10 is connected to the drawing vehicle 20, the chain 70 will be substantially slack and the insulator 64 between the switch contact members 52, 56 will maintain the switch in an open position, so that the brakes are not energized. However, if the connection between the trailer and the drawing vehicle should be broken, the insulator 64 will be automatically pulled out of the opening 66 in the housing 24 and the contact member 56, by virtue of its resiliency, will automatically engage the contact member 52, thus closing the switch and immediately actuating the trailer brakes.

It is believed that the advantages and use of the invention will be readily apparent from the foregoing disclosure and accordingly, further description thereof is deemed unnecessary.

While in the foregoing there has been shown and described the preferred embodiment of this invention, it is to be understood that minor changes in the details of construction and arrangement of parts may be resorted to without departing from spirit and scope of the invention as claimed.

Having described the invention what is claimed as new is:

1. In an electric switch, the combination of a base plate of insulating material, a pair of mutually spaced studs secured to and projecting upwardly from said base plate, a stationary contact strip resting with one longitudinal edge thereof on the base plate and provided at the ends thereof with a pair of tubular anchoring members positioned on the respective studs, another upstanding stud secured to the base plate at a point spaced longitudinally from and to one side of said stationary contact strip, a movable contact strip of resilient material provided at one end thereof with a tubular anchoring member positioned on the last mentioned stud, an upstanding stop pin provided on the base plate at a point intermediate the ends of said movable contact strip and at the side of the latter remote from the stationary strip whereby to urge a free end portion of the movable strip in contact with the stationary strip, and a removable insulating bar interposed between said free end portion of the movable strip and the stationary strip, whereby to electrically isolate the same, said stationary strip being parallel to and constituting a sliding guide for said insulating bar.

2. The device as defined in claim 1, wherein said last mentioned stud and one of said pair of studs provide means for connecting electrical wires to said contact strips.

References Cited in the file of this patent
UNITED STATES PATENTS

| Number | Name | Date |
|---|---|---|
| 1,562,183 | Norton | Nov. 17, 1925 |
| 1,575,469 | Waterbury | Mar. 2, 1926 |
| 1,861,770 | Whyte | June 7, 1932 |
| 1,896,963 | Leventis | Feb. 7, 1933 |
| 1,948,519 | Grady | Feb. 27, 1934 |
| 2,228,120 | Koehler | Jan. 7, 1941 |
| 2,439,167 | Gunderson | May 16, 1944 |